(12) United States Patent
Merzhaeuser et al.

(10) Patent No.: US 11,680,555 B2
(45) Date of Patent: Jun. 20, 2023

(54) JOINTED WIND TURBINE ROTOR BLADE HAVING VARYING MATERIAL COMBINATIONS ALONG ITS SPAN FOR PIN REINFORCEMENT

(71) Applicant: General Electric Company, Schenectady, NY (US)

(72) Inventors: Thomas Merzhaeuser, Munich (DE); Aaron A. Yarbrough, Greenville, SC (US); Andrew Mitchell Rodwell, Greenville, SC (US); Rishikesh Kumar, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/290,308

(22) PCT Filed: Oct. 30, 2019

(86) PCT No.: PCT/US2019/058692
§ 371 (c)(1),
(2) Date: Apr. 30, 2021

(87) PCT Pub. No.: WO2020/092458
PCT Pub. Date: May 7, 2020

(65) Prior Publication Data
US 2021/0372366 A1 Dec. 2, 2021

(30) Foreign Application Priority Data
Oct. 31, 2018 (IN) .............................. 201841041237

(51) Int. Cl.
*F03D 1/06* (2006.01)

(52) U.S. Cl.
CPC ...... *F03D 1/0675* (2013.01); *F05B 2230/604* (2013.01); *F05B 2240/302* (2013.01); *F05B 2260/30* (2013.01); *F05B 2280/6003* (2013.01)

(58) Field of Classification Search
CPC .............. F03D 1/0675; F05B 2230/604; F05B 2240/302; F05B 2260/30
See application file for complete search history.

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| EP | 2186622 A1 | 5/2010 |
| EP | 3144526 A1 | 3/2017 |

(Continued)

OTHER PUBLICATIONS

PCT International Search Report corresponding to PCT/US2019/058692 dated Apr. 1, 2020.

*Primary Examiner* — Eldon T Brockman
(74) *Attorney, Agent, or Firm* — Dority & Manning, P.A.

(57) ABSTRACT

A jointed rotor blade includes a first blade segment and a second blade segment extending in opposite directions from a chord-wise joint. Each of blade segments has at least one shell member defining an airfoil surface and an internal support structure. The internal support structure of the first blade segment includes a beam structure extending lengthwise that structurally connects with the internal support structure of the second blade segment via a receiving section. The rotor blade further includes one or more pin joints positioned on at least one of internal support structures of the first blade segment or the second blade segment. Thus, at least one of internal support structures of the first blade segment or the second blade segment includes varying (Continued)

material combinations along a span of the rotor blade at locations of the one or more pin joints so as to reinforce the one or more pin joints.

15 Claims, 6 Drawing Sheets

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 5,281,454 A | 1/1994 | Hanson | |
| 7,334,989 B2 | 2/2008 | Arelt | |
| 7,344,360 B2 | 3/2008 | Wetzel | |
| 7,521,105 B2 | 4/2009 | Bech et al. | |
| 7,901,188 B2 | 3/2011 | Llorente Gonzalez et al. | |
| 7,922,454 B1 | 4/2011 | Riddell | |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,777,573 B2 * | 7/2014 | Hibbard | F03D 13/10 416/132 B |
| 8,919,754 B2 | 12/2014 | Schibsbye | |
| 9,669,589 B2 | 6/2017 | Zamora Rodriguez et al. | |
| 9,765,756 B2 * | 9/2017 | Hancock | F03D 1/0683 |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0132884 A1 | 6/2010 | Baehmann et al. | |
| 2010/0215494 A1 | 8/2010 | Bech et al. | |
| 2010/0304170 A1 | 12/2010 | Frederiksen | |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 * | 4/2011 | Hancock | F03D 1/0683 29/889.7 |
| 2011/0158788 A1 | 6/2011 | Bech et al. | |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0204200 A1 | 7/2015 | Eyb et al. | |
| 2015/0369211 A1 * | 12/2015 | Merzhaeuser | F03D 17/00 416/61 |
| 2018/0274521 A1 | 9/2018 | Akhtar et al. | |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

* cited by examiner

```
┌─────────────────────────────────────────────────────────────────┐
│ ARRANGE A FIRST BLADE SEGMENT AND A SECOND BLADE SEGMENT IN     │
│ OPPOSITE DIRECTIONS FROM A CHORD-WISE JOINT, EACH OF THE BLADE  │
│ SEGMENTS HAVING A PRESSURE SIDE SHELL MEMBER, A SUCTION SIDE    │─ 102
│ SHELL MEMBER, AND AN INTERNAL SUPPORT STRUCTURE, THE INTERNAL   │
│ SUPPORT STRUCTURES OF THE BLADE SEGMENTS COMPRISING A SHEAR WEB │
│ CONNECTED WITH A SUCTION SIDE SPAR CAP AND A PRESSURE SIDE SPAR │
│ CAP, THE SHEAR WEBS COMPRISING VARYING MATERIAL COMBINATIONS    │
│ ALONG A SPAN OF THE ROTOR BLADE                                 │
└─────────────────────────────────────────────────────────────────┘
                                  ↓
┌─────────────────────────────────────────────────────────────────┐
│ INSERT THE BEAM STRUCTURE EXTENDING LENGTHWAYS FROM THE FIRST   │─ 104
│ BLADE SEGMENT INTO A RECEIVING SECTION OF THE SECOND BLADE      │
│ SEGMENT                                                         │
└─────────────────────────────────────────────────────────────────┘
                                  ↓
┌─────────────────────────────────────────────────────────────────┐
│ ATTACH A FREE END OF THE BEAM STRUCTURE WITH A RECEIVING END OF │─ 106
│ THE RECEIVING SECTION OF THE SECOND BLADE SEGMENT USING ONE OR  │
│ MORE FIRST PIN JOINTS                                           │
└─────────────────────────────────────────────────────────────────┘
                                  ↓
┌─────────────────────────────────────────────────────────────────┐
│ CONNECT THE FIRST AND SECOND BLADE SEGMENTS USING ONE OR MORE   │
│ SECOND PIN JOINTS LOCATED AT THE CHORD-WISE JOINT, WHEREIN, WHEN│─ 108
│ THE FIRST AND SECOND BLADE SEGMENTS ARE CONNECTED, A THICKNESS  │
│ OF THE SHEAR WEB A LOCATIONS OF AT LEAST ONE OF THE ONE OR MORE │
│ FIRST PIN JOINTS OR THE ONE OR MORE SECOND PIN JOINTS IS GREATER│
│ THAN A THICKNESS OF REMAINING PORTIONS OF THE SHEAR WEB SO AS TO│
│ REINFORCE AT LEAST ONE OF THE ONE OR MORE FIRST PIN JOINTS OR   │
│ THE ONE OR MORE SECOND PIN JOINTSS                              │
└─────────────────────────────────────────────────────────────────┘
```

FIG. 10

JOINTED WIND TURBINE ROTOR BLADE HAVING VARYING MATERIAL COMBINATIONS ALONG ITS SPAN FOR PIN REINFORCEMENT

FIELD

The present disclosure relates generally to wind turbines, and more particularly to jointed rotor blades for wind turbines having varying material combinations along its span for pin reinforcement.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

In recent years, wind turbines for wind power generation have increased in size to achieve improvement in power generation efficiency and to increase the amount of power generation. Along with the increase in size of wind turbines for wind power generation, wind turbine rotor blades have also increased in size. As such, various difficulties, such as a difficulty in integral manufacture and transportation difficulties, may occur in wind turbine rotor blades.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade after, for example, the individual blade segments are transported to the field. However, known joint designs for connecting the blade segments together are not without issue.

Thus, the art is continuously seeking new and improved jointed rotor blades for wind turbines. Accordingly, the present disclosure is directed to a jointed rotor blade for a wind turbine having varying or dissimilar material combinations along its span for pin reinforcement.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments has at least one shell member defining an airfoil surface and an internal support structure. The internal support structure of the first blade segment includes a beam structure extending lengthwise that structurally connects with the internal support structure of the second blade segment via a receiving section. The rotor blade further includes one or more pin joints positioned on at least one of internal support structures of the first blade segment or the second blade segment. Thus, at least one of internal support structures of the first blade segment or the second blade segment includes varying material combinations along a span of the rotor blade at locations of the one or more pin joints so as to reinforce the one or more pin joints.

In one embodiment, at least one of the internal support structures of the first and second blade segments may include at least one shear web connected with a suction side spar cap and a pressure side spar cap. In such embodiments, the shear web may include the varying material combinations along the span of the rotor blade at the locations of the one or more pin joints.

In another embodiment, the varying material combinations may include varying resin materials, varying metal materials, varying fiber materials, varying fiber orientations, and/or combinations thereof. The varying resin materials may include, for example, a thermoset resin or a thermoplastic resin. The varying fiber materials may include, for example, glass fibers, carbon fibers, polymer fibers, wood fibers, bamboo fibers, ceramic fibers, nanofibers, metal fibers, or combinations thereof. In another embodiment, a fiber orientation at the locations of the one or more bolts joints may be, for example, a quasi-isotropic fiber orientation.

In further embodiments, a thickness of the shear web at the locations of the one or more pin joints is greater than a thickness of remaining portions of the shear web. In additional embodiments, the varying material combinations may include one or more reinforcement members at the locations of the one or more pin joints. In such embodiments, the web reinforcement(s) may include at least one tapered transition feature at an edge thereof, such as a generally semi-circular cut-out or similar non-rectangular edge in order to produce a tapered transition to the adjacent materials.

In several embodiments, the pin joint(s) may include, at least, one or more first pin joints located at a first end of the beam structure for connecting with a receiving end of the receiving section of the second blade segment. In such embodiments, the first pin joint(s) may include at least one pin tube embedded in a first material combination of the varying material combinations.

In particular embodiments, the first blade segment may also include a chord-wise extending pin joint slot located on the beam structure proximate to the chord-wise joint. In such embodiments, the pin joint slot may be surrounded by a second material combination of the varying material combinations. Further, the first and second material combinations may differ from a primary material combination of the shear web.

In another aspect, the present disclosure is directed to a rotor blade for a wind turbine. The rotor blade includes at least one blade segment having at least one shell member defining an airfoil surface and an internal support structure. The internal support structure extends in a span-wise direction of the rotor blade and includes at least one shear web connected with a suction side spar cap and a pressure side spar cap. The shear web(s) is constructed of a core material combination sandwiched between a leading edge material combination and a trailing edge material combination. Thus, the core material combination and/or the leading edge or trailing edge material combinations vary along a span of the rotor blade.

In yet another aspect, the present disclosure is directed to a method of assembling a rotor blade of a wind turbine. The method includes arranging a first blade segment and a second blade segment in opposite directions from a chord-wise joint. Each of the blade segments includes least one shell member defining an airfoil surface and an internal support structure. At least one of the internal support structures of the blade segments include at least one shear web connected with a suction side spar cap and a pressure side spar cap. Further, the shear web may include varying material combinations along a span of the rotor blade. The method also includes inserting the beam structure extending lengthwise from the first blade segment into a receiving section of the second blade segment. Moreover, the method includes attaching a free end of the beam structure with a receiving end of the receiving section of the second blade segment using one or more first pin joints. In addition, the method includes connecting the first and second blade segments using one or more second pin joints located at the chord-wise joint. As such, when the first and second blade segments are connected, a thickness of the shear web at locations of at least one of the one or more first pin joints or the one or more second pin joints is greater than a thickness of remaining portions of the shear web so as to reinforce at least one of the one or more first pin joints or the one or more second pin joints.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 illustrates a flow chart of one embodiment of a method of assembling a wind turbine blade according to the present disclosure.

DETAILED DESCRIPTION

Figure 1:
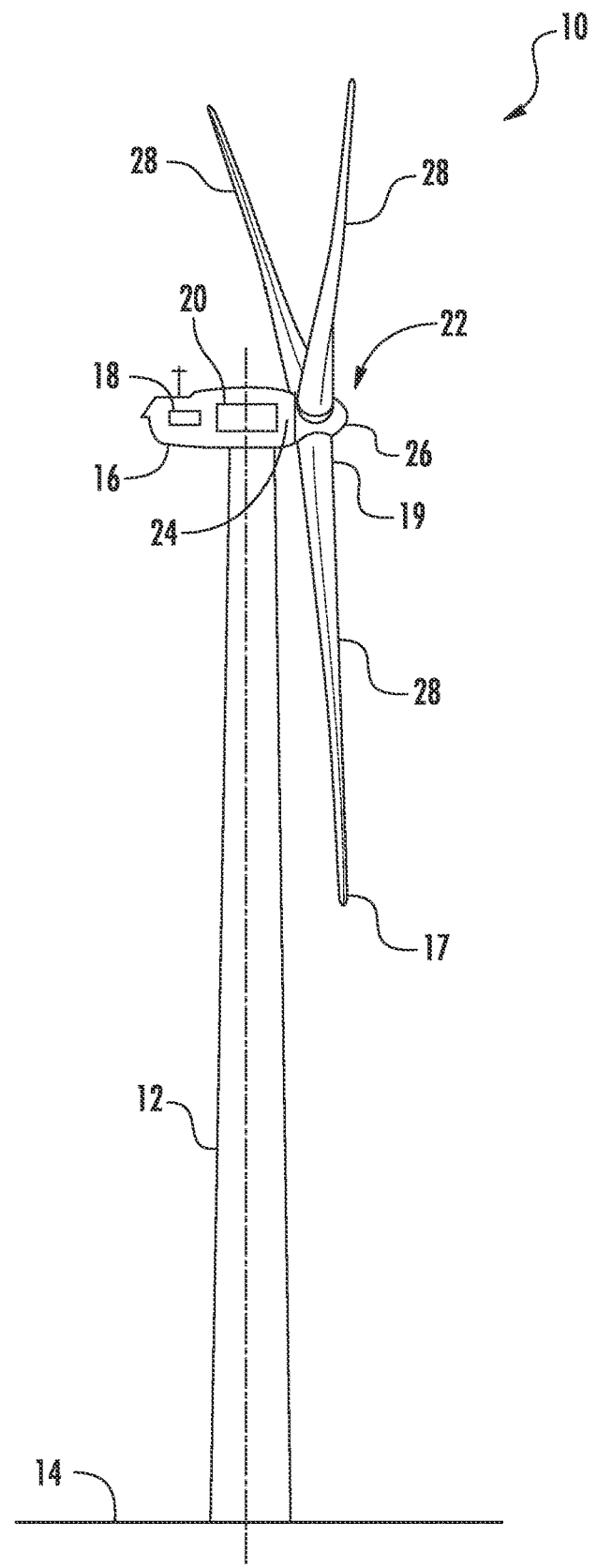
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
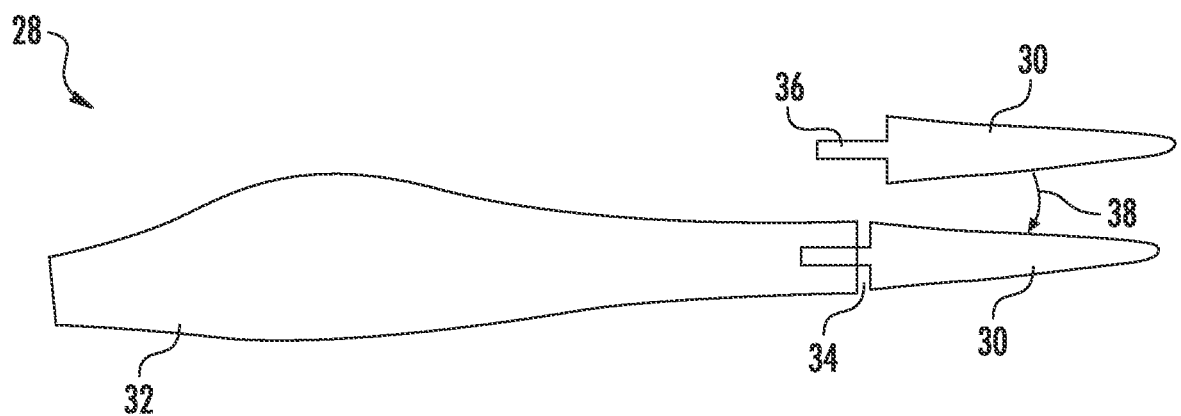
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member defining an airfoil surface. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

Figure 3:
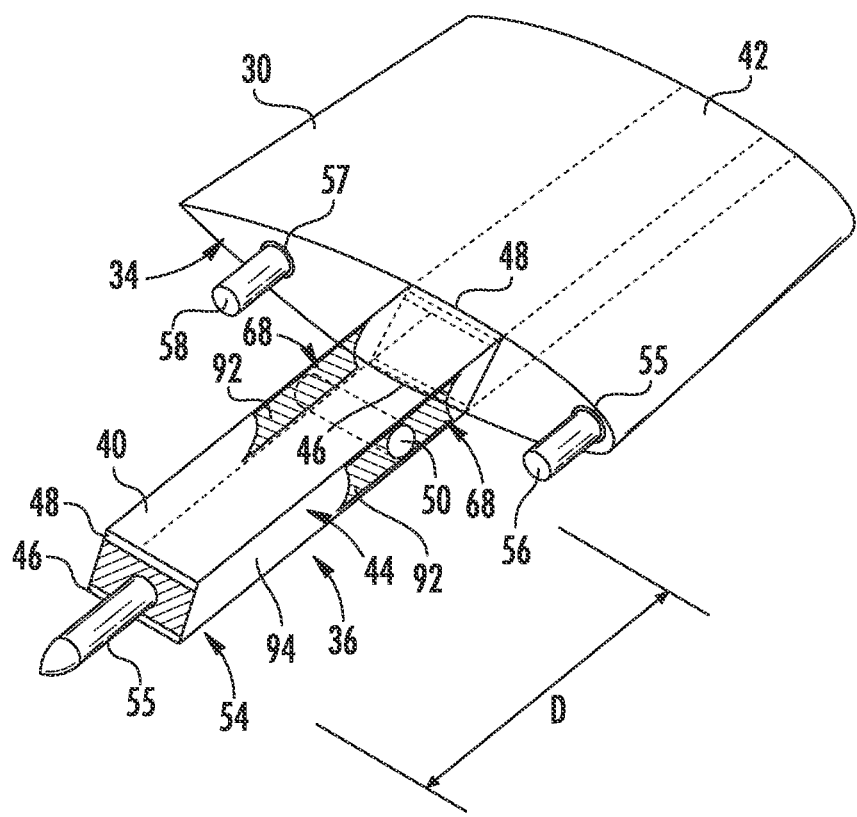
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48.

Moreover, as shown, the first blade segment 30 may include one or more first pin joints towards a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 proximate to the chord-wise joint 34. Moreover, as shown, the pin joint slot 50 may be oriented in a chord-wise direction. In one example, there may be a bushing within the pin joint slot 50 arranged in a tight interference fit with a pin tube or pin (shown as pin 53 in FIG. 6). Further, the first blade segment 30 may include multiple second pin joint tubes 56, 58 located at the chord-wise joint 34. Thus, as shown, the second pin joint tubes 56, 58 may include a leading edge pin joint tube 56 and a trailing edge pin joint tube 58. Further, each of the second pin joint tubes 56, 58 may be oriented in a span-wise direction. In addition, as shown, each of the second pin joint tubes 56, 58 may include multiple flanges 55, 57, respectively, that are configured to distribute compression loads at the chord-wise joint 34.

It is to be noted that the pin tube 52 located at the first end of the beam structure 40 may be separated span-wise with the multiple second pin joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the pin joints connecting the first and second blade segments 30, 32 may include an interference-fit steel bushed joint.

Figure 4:
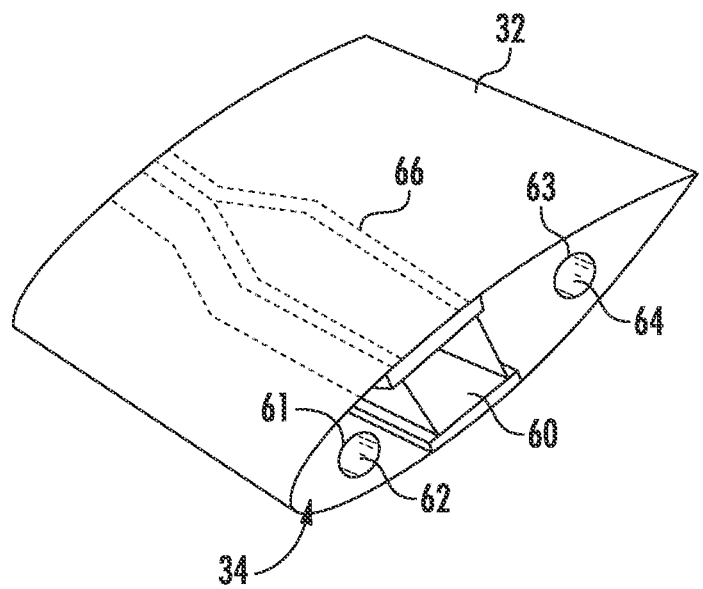
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. The receiving section 60 includes multiple spar structures 66 that extend lengthwise for connecting with the beam structure 40 of the first blade segment 30. As shown, the second blade segment 32 may further include pin joint slots 62, 64 for receiving pin tubes 56, 58 (shown in FIG. 3) of the first blade segment 30 and forming tight interference fittings. In one example, each of the multiple pin joint slots 62, 64 may include multiple flanges 61, 63, respectively, that are configured to distribute compression loads at the chord-wise joint 34.

Figure 5:
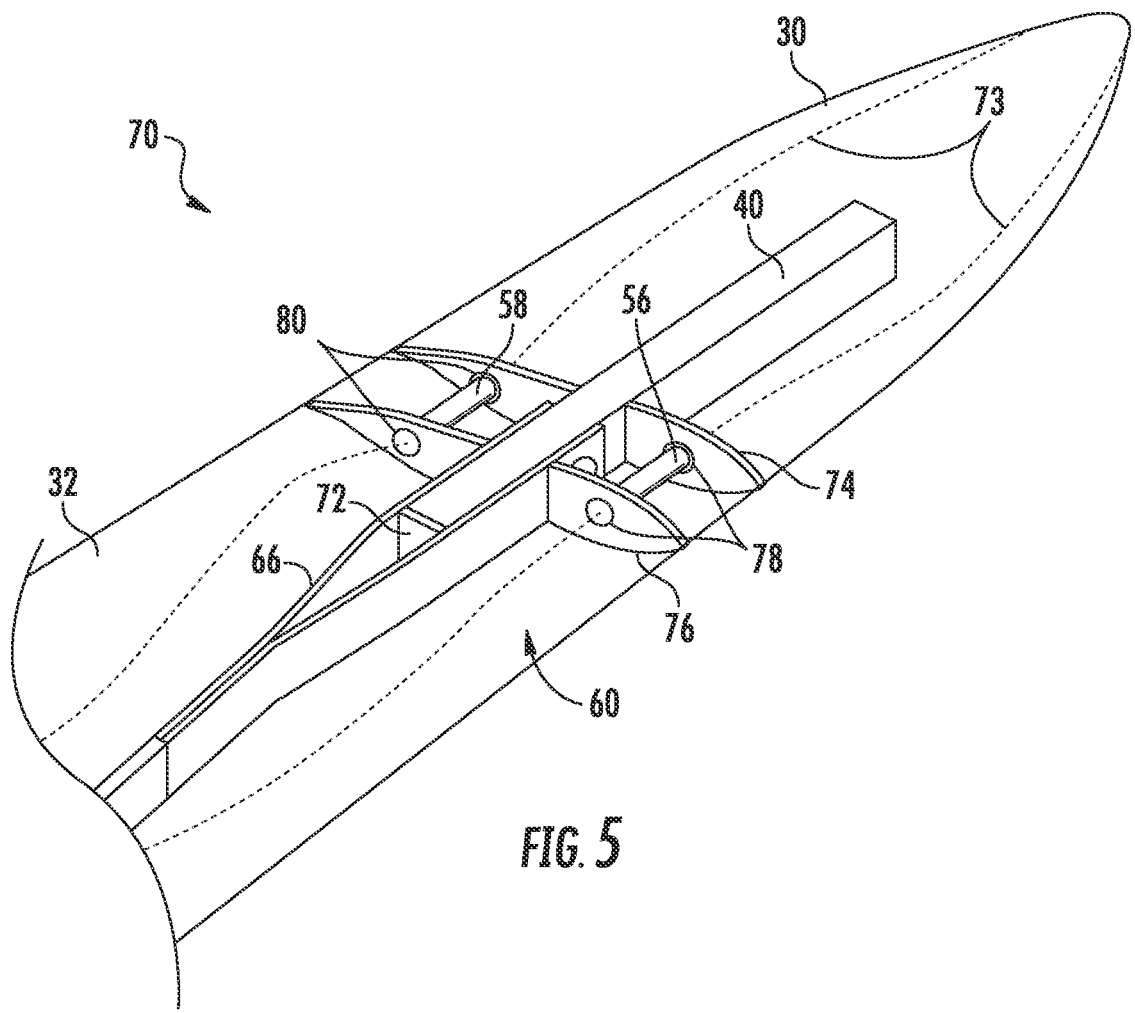
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge pin openings 78 and trailing edge pin openings 80 that allows pin joint connections between the first and second blade segments 30, 32. For example, as shown, the chord-wise members 74, 76 are connected by pin tubes 56 and 58 that are in tight interference fit with bushings located in the leading edge pin openings 78 and the trailing edge pin openings 80. In another embodiment, each of the spar structures 66, the rectangular fastening element 72, and the chord-wise members 74, 76 may be constructed of glass reinforced fibers. In this example, the assembly 70 may also include multiple lightening receptor cables 73 that are embedded between the multiple pin tubes or pins 56, 58 and the bushing connections attached to the chord-wise members 74, 76.

Figure 6:
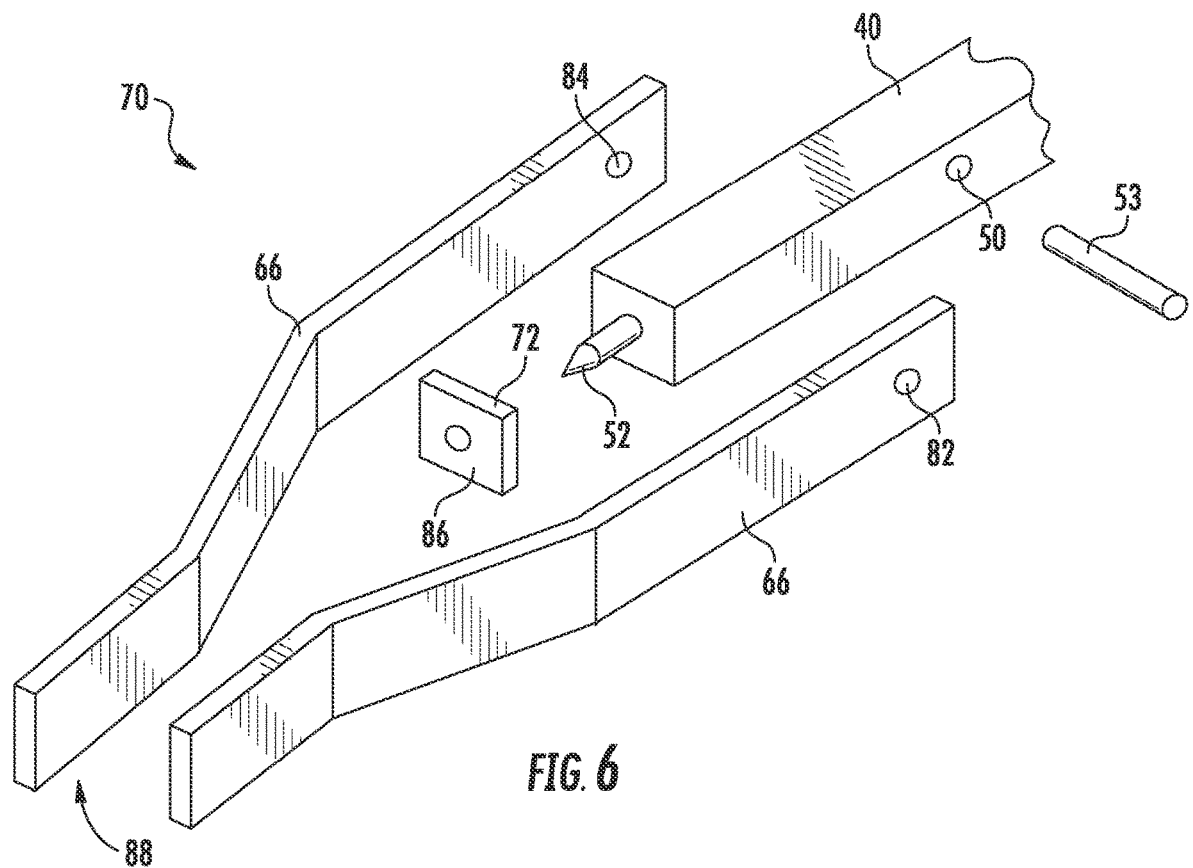
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, a pair of spar structures 66 is configured to receive the beam structure 40 and includes pin joint slots 82, 84 that are aligned with the pin joint slot 50 of the beam structure 40 through which a pin tube or pin 53 may be inserted. Further, the pin 53 is configured to remain in a tight interference fit within the aligning pin joint slots 82, 50, 84 such that spar structures 66 and the beam structure 40 are joined together by during assembling. Further, FIG. 6 also illustrates the rectangular fastening element 72 that includes a pin joint slot 86 configured for receiving the pin tube 52 of the beam structure 40. As such, the pin tube 52 is configured to form a tight interference fit bolted joint. Further, the pair of spar structures 66 may be joined together at one end 88 using any suitable adhesive material or an elastomeric seal.

Referring to FIG. 3, the shear web 44 of the rotor blade 28 includes varying material combinations along a span of the rotor blade 28 at locations of the pin joints (e.g. at pin joint slot 50 and/or first end 54 so as to reinforce the pin joints). For example, the varying materials are chosen to have improved mechanical properties such as tensile, shear and/or compressive strength and/or modulus of elasticity to allow for higher concentration of loads (operating stresses) at the pin joints. This allows for the crush and bending loads applied by the pin joints. Therefore, the better the properties, the smaller the pins and/or the thinner the webs can be.

More specifically, in several embodiments, the pin joint(s) may include, at least, the first pin joints 52 located at the first end 54 of the beam structure 40 for connecting with the receiving section 60 of the second blade segment 32. In such embodiments, the pin tube 52 of the first pin joint(s) may be embedded in a first material combination 90 of the varying material combinations. In addition, the pin joint slot 50 of the beam structure 60 may be surrounded by a second material combination 92 of the varying material combinations. In such embodiments, the first and second material combinations 90, 92 may differ from a primary material combination 94 of the shear web 44.

As described herein, the varying material combinations may include varying resin materials, varying metal materials, varying fiber materials, varying fiber orientations, and/or combinations thereof. The varying resin materials may include, for example, a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluoropolymer, ethylmethyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Figure 8:
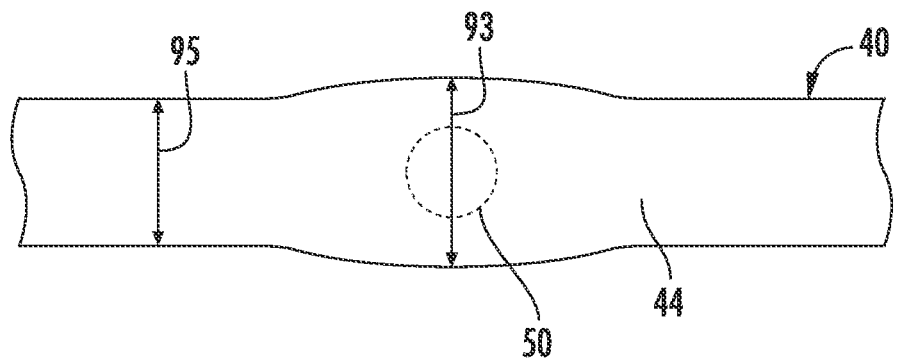
FIG. 8 illustrates a side view of one embodiment of a shear web of a rotor blade according to the present disclosure.

The varying metal materials may include, for example, aluminum, titanium, steel, and/or any other suitable metal or metal alloy material. The varying fiber materials described herein may include, for example, glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof. Further, the fiber content may vary depending on the thickness or stiffness required for transferring the load at a particular location in the shear web 44. For example, in one embodiment, a fiber orientation at the locations of the bolts joints may include, for example, a quasi-isotropic fiber orientation. In further embodiments, as shown in FIG. 8, a thickness 93 of the shear web 44 at the locations of one or more of the pin joint(s) may be greater than a thickness 95 of remaining portions of the shear web 44.

Figure 7:
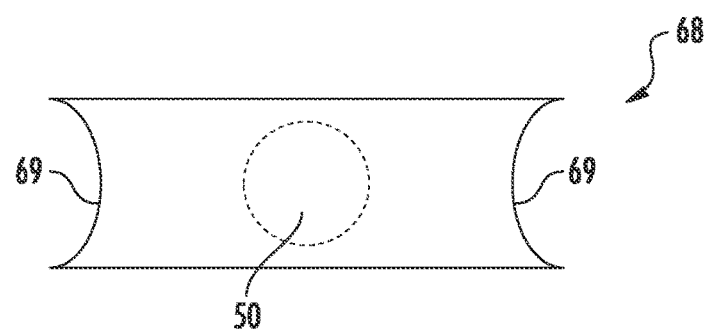
FIG. 7 illustrates a side view of one embodiment of a web reinforcement for a shear web of a rotor blade according to the present disclosure.

Referring particularly to FIGS. 3 and 7, the varying material combinations may include one or more reinforcement members 68 at the locations of the one or more pin joints. For example, as shown, the shear web 44 includes at least two reinforcement members 68 surrounding the pin joint slot 50 so as to reinforce the pin joint. In such embodiments, the web reinforcement(s) 68 may also include at least one tapered transition feature at an edge thereof, such as semi-circular cut-out 69. More specifically, as shown in FIG. 7, the web reinforcement(s) 68 includes opposing semi-circular cut-outs 69 on each end thereof. Such tapered transition features may have a similar configuration to that of the start and end of the shear web 44.

Figure 9:
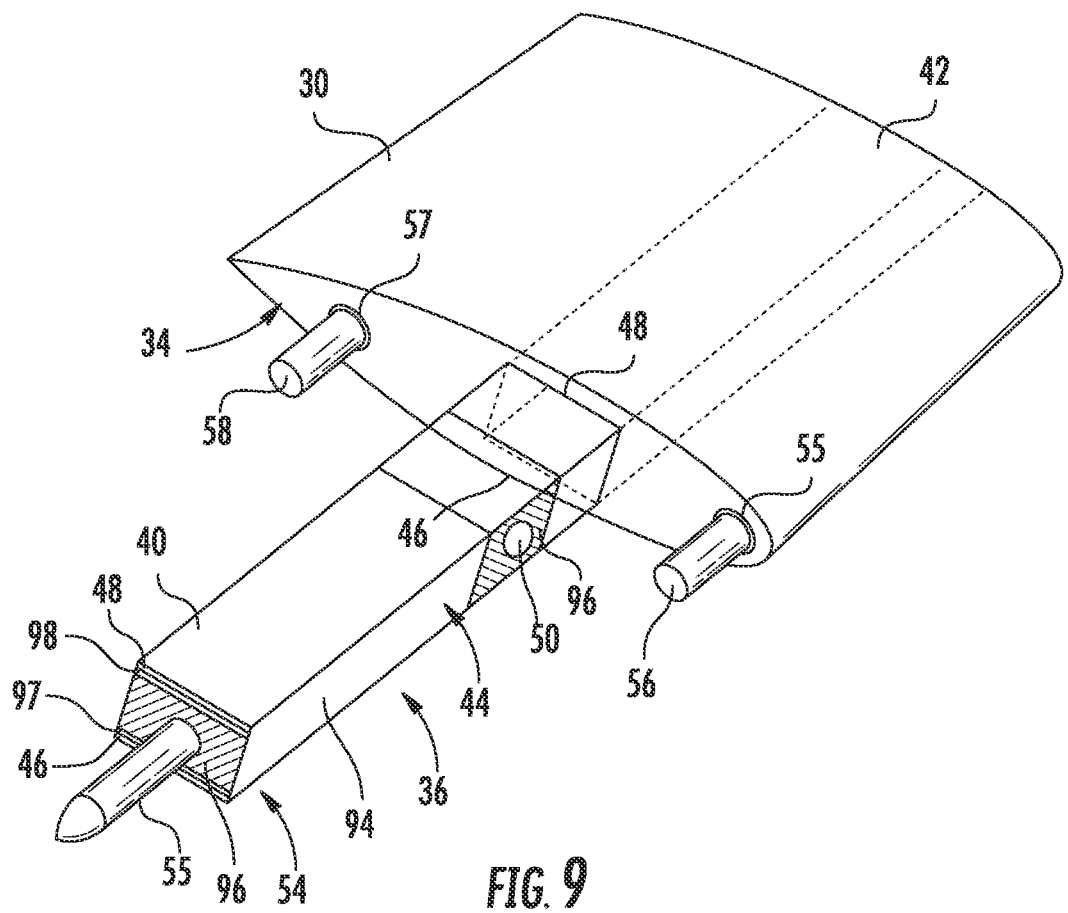
FIG. 9 illustrates a perspective view of a section of another embodiment of the first blade segment according to the present disclosure.

Referring now to FIG. 9, a perspective view of another embodiment of the first blade segment 30 of the rotor blade 28 according to the present disclosure is illustrated. As shown, the first blade segment is configured similar to the embodiment of FIG. 3. In addition, as shown, the shear web 44 may be constructed of a core material 96 sandwiched between a suction side material 97 and a pressure side material 98. Moreover, as shown, the core material 96 varies along the span of the rotor blade 28 at locations of the pin joints so as to reinforce the pin joints.

Referring now to FIG. 10, a flow chart 100 of a method of assembling a wind turbine blade according to the present disclosure is illustrated. In general, the method 100 will be described herein with reference to the wind turbine 10 and the rotor blade 28 shown in FIGS. 1-9. However, it should be appreciated that the disclosed method 100 may be implemented with rotor blades having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include arranging the first blade segment 30 and the second blade segment 32 in opposite directions from the chord-wise joint 34. As mentioned, each of the blade segments 30, 32 has at least one shell member defining an airfoil surface and an internal support structure 36. The internal support structures 36 of the blade segments 30, 32 include a shear web 44 connected with a suction side spar cap 46 and a pressure side spar cap 48. Further, the shear webs 44 include varying material combinations along a span of the rotor blade 28. For example, in one embodiment, the method 100 may include infusing or bonding the varying material combinations to the shear web 44.

As shown at (104), the method 100 may include inserting the beam structure 40 extending lengthwise from the first blade segment 30 into the receiving section 60 of the second blade segment 32. As shown at (106), the method 100 may include attaching a free end 54 of the beam structure 40 with a receiving end of the receiving section 60 of the second blade segment 32 using one or more first pin joints. As shown at (108), the method 100 may include connecting the first and second blade segments 30, 32 using one or more second pin joints 58 located at the chord-wise joint 34. Thus, when the first and second blade segments 30, 32 are connected, a thickness 93 of the shear web 44 at locations of at least one of the one or more first pin joints or the one or more second pin joints is greater than a thickness 95 of remaining portions of the shear web 44 so as to reinforce at least one of the one or more first pin joints or the one or more second pin joints.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
    a first blade segment and a second blade segment extending in opposite directions from a chord-wise joint, each of the first and second blade segments comprising at least one shell member defining an airfoil surface and an internal support structure, the internal support structure of the first blade segment comprising a beam structure extending lengthwise that structurally connects with the internal support structure of the second blade segment via a receiving section; and
    one or more pin joints positioned on at least one of internal support structures of the first blade segment or the second blade segment,
    wherein at least one of internal support structures of the first blade segment or the second blade segment comprises varying material combinations along a span of the rotor blade at locations of the one or more pin joints so as to reinforce the one or more pin joints,
    wherein the varying material combinations further comprise one or more reinforcement members at the locations of the one or more pin joints, and wherein the one or more reinforcement members comprise a core material that is different than a core material from remaining portions of the internal support structures.

2. The rotor blade of claim 1, wherein at least one of the internal support structures of the first and second blade segments comprise at least one shear web connected with a suction side spar cap and a pressure side spar cap, the shear web comprising the varying material combinations along the span of the rotor blade at the locations of the one or more pin joints.

3. The rotor blade of claim 2, wherein the varying material combinations comprises at least one of varying resin materials, varying metal materials, varying fiber materials, varying fiber orientations, and/or combinations thereof.

4. The rotor blade of claim 3, wherein the varying resin materials comprise at least one of a thermoset resin or a thermoplastic resin.

5. The rotor blade of claim 3, wherein the varying fiber materials comprise at least one of glass fibers, carbon fibers, polymer fibers, wood fibers, bamboo fibers, ceramic fibers, nanofibers, metal fibers, or combinations thereof.

6. The rotor blade of claim 3, wherein a fiber orientation at the locations of the one or more bolts joints comprises a quasi-isotropic fiber orientation.

7. The rotor blade of claim 3, wherein a thickness of the shear web at the locations of the one or more pin joints is greater than a thickness of remaining portions of the shear web.

8. The rotor blade of claim 1, wherein the one or more reinforcement members comprise at least one tapered transition feature at an edge thereof.

9. The rotor blade of claim 1, wherein the one or more pin joints comprises, at least, one or more first pin joints located at a first end of the beam structure for connecting with a receiving end of the receiving section of the second blade segment, the one or more first pin joints comprising at least one pin tube embedded in a first material combination of the varying material combinations.

10. The rotor blade of claim 9, wherein the first blade segment comprises at least one chord-wise extending pin joint slot located on the beam structure proximate to the chord-wise joint, the at least one pin joint slot surrounded by a second material combination of the varying material combinations, wherein the first and second material combinations differ from a primary material combination of the shear web.

11. A method of assembling a rotor blade of a wind turbine, the method comprising:
    arranging a first blade segment and a second blade segment in opposite directions from a chord-wise joint, each of the blade segments having a shell member defining an airfoil surface and an internal support structure, at least one of the internal support structures of the blade segments comprising a shear web;
    inserting the beam structure extending lengthwise from the first blade segment into a receiving section of the second blade segment;
    attaching a free end of the beam structure with a receiving end of the receiving section of the second blade segment using one or more first pin joints; and
    connecting the first and second blade segments using one or more second pin joints located at the chord-wise joint, wherein, when the first and second blade segments are connected, a thickness of the shear web at locations of at least one of the one or more first pin joints or the one or more second pin joints is greater than a thickness of remaining portions of the shear web so as to reinforce at least one of the one or more first pin joints or the one or more second pin joints, and
    wherein at least one of the beam structure or the receiving section comprises varying material combinations along a span of the rotor blade at locations of the one or more first and second pin joints so as to reinforce the one or more first and second pin joints,
    wherein the varying material combinations further comprise one or more reinforcement members at the locations of the one or more first and second pin joints, and wherein the one or more reinforcement members comprise a core material that is different than a core material from remaining portions of the internal support structures.

12. The method of claim 11, wherein the varying material combinations comprises at least one of varying resin materials, varying metal materials, varying fiber materials, varying fiber orientations, and/or combinations thereof, the varying resin materials comprising at least one of a thermoset resin or a thermoplastic resin, the varying fiber materials comprising at least one of glass fibers, carbon fibers, polymer fibers, wood fibers, bamboo fibers, ceramic fibers, nanofibers, metal fibers, or combinations thereof.

13. The method of claim 11, further comprising at least one of infusing or bonding the varying material combinations to the shear web.

14. The method of claim 11, further comprising forming at least one tapered transition feature into an edge of the one or more reinforcement members.

15. The method of claim 11, wherein the one or more first pin joints further comprise at least one pin tube embedded in a first material combination of the varying material combinations, the first blade segment comprising at least one chord-wise extending pin joint slot located on the beam structure proximate to the chord-wise joint, the at least one pin joint slot surrounded by a second material combination of the varying material combinations, wherein the first and second material combinations differ from a primary material combination of the shear web.

* * * * *